United States Patent Office 2,988,238
Patented June 13, 1961

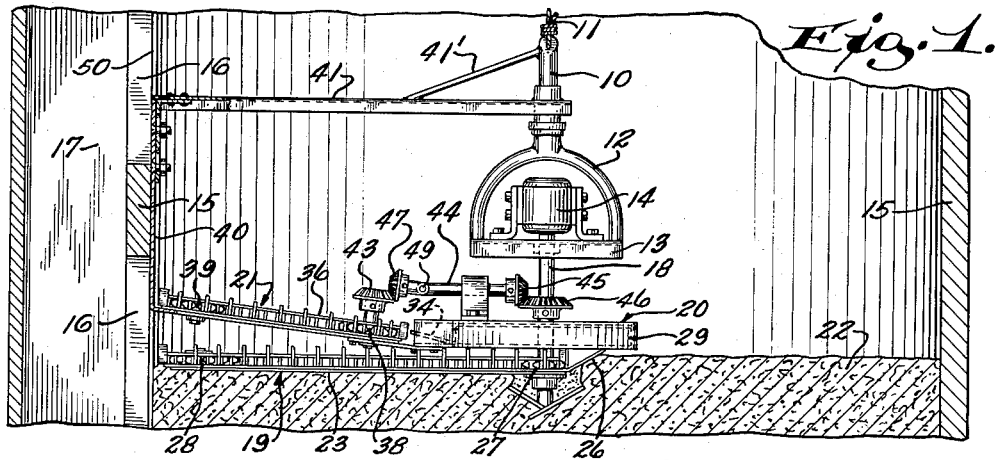
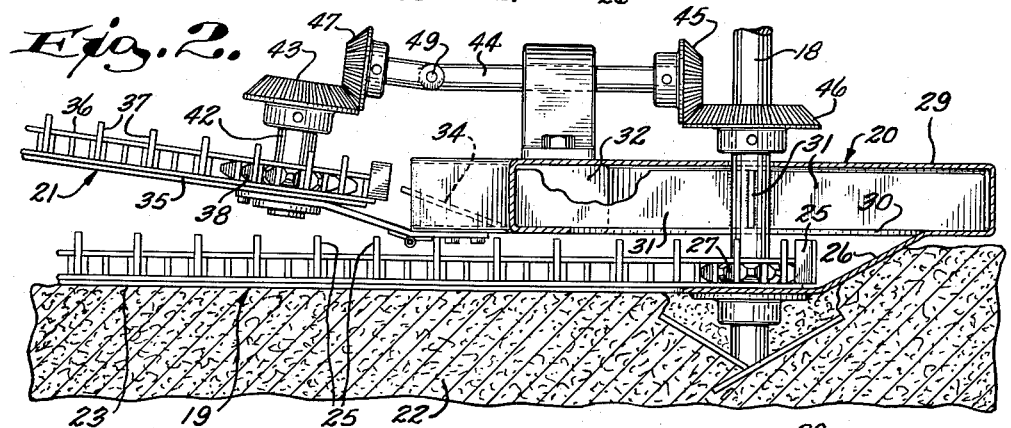
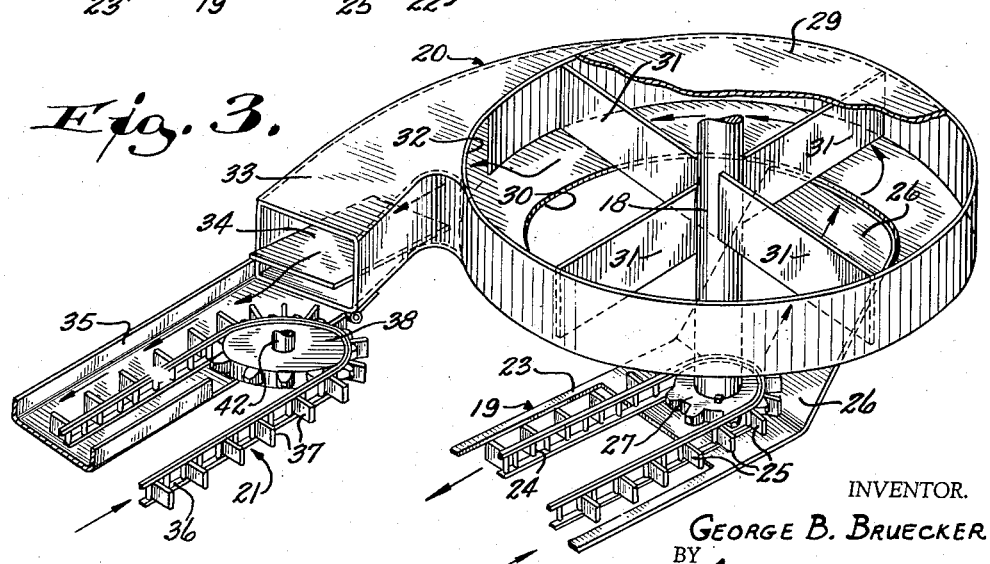
INVENTOR.
GEORGE B. BRUECKER
BY Morsell + Morsell
ATTORNEYS.

2,988,238
SILO UNLOADING MACHINES
George B. Bruecker, 1412 Oak Ridge, Kaukauna, Wis.
Filed May 27, 1960, Ser. No. 32,405
6 Claims. (Cl. 214—17)

This invention relates to improvements in silo unloading machines, and more particularly to an automatic unloader having an improved silage elevating mechanism.

Conventional silo unloading machines generally comprise a rotary collector arm which sweeps around the silo and moves the upper surface of the silage radially inwardly, and an auger or bucket-type mechanical lift which raises the silage accumulated by said collector arm onto a lateral conveyor which carries the same to the silo exterior. In some machines an electric blower is employed to raise and discharge the silage, in place of a mechanical lift and conveyor assemblage, but with either form of elevating device it will be appreciated that a relatively complex and expensive mechanism is required. Moreover, it takes considerable power to drive such conventional lifting mechanisms, which adds substantially to the operating cost of the machine. With this in mind, therefore, the principal object of the present invention is to provide a silo unloader having a simplified silage elevating mechanism wherein centrifugal force is employed as the principal lifting means, thereby not only substantially reducing the cost of manufacture, but minimizing the power requirements of the machine and reducing its operating cost.

A further object is to provide a silo unloader having an improved, simplified silage lifting mechanism as described, which mechanism is more efficient in operation than the complex devices employed in conventional unloaders, and which is less susceptible to mechanical failures or breakdowns.

With the above and other objects in view, the invention consists of the improved silo unloading machine and all of its parts and combinations, as set forth in the claims, and all equivalents thereof.

In the accompanying drawing, illustrating the preferred form of the invention, and wherein like reference characters indicate the same parts in all of the views:

FIG. 1 is a fragmentary vertical sectional view of a silo showing, in side elevation, the improved unloader in operative position therein;

FIG. 2 is an enlarged, fragmentary side elevational view of the novel silage lifting mechanism employed in the present invention, with parts thereof broken away and shown in section; and FIG. 3 is a perspective view of the lifting mechanism with a part of the housing broken away.

Referring now more particularly to FIG. 1 of the drawing, it will be seen that the automatic silo unloader comprising the present invention includes a vertical supporting shaft 10 positioned centrally in the silo and which is ordinarily suspended from the silo roof by means of a cable 11. Said cable is preferably secured to a power winch or other mechanical winding device on the silo exterior so that the assemblge can be easily raised and lowered in the silo during operation, as will be described. The lower end of said vertical shaft 10 is in the form of a yoke 12 and carries a platform 13 on which a motor 14 or other prime mover is mounted.

The silo 15 illustrated herein is of the conventional cylindrical type and includes a row of vertically spaced doorways 16 extending the entire height of the silo, and a silage discharge chute 17 attached to the silo exterior adjacent said doorways. In practice, the doorways are provided with removable doors which are taken out one at a time as the level of the silage descends, and during the unloading operation the silage is discharged through the nearest doorway and into the chute 17, where it is collected on a conveyor or the like and is transported to the livestock feeding stations.

The motor 14 has a vertical drive shaft 18 depending therebelow, and drivably mounted on the lower end portion of said drive shaft is the rotary collector arm 19 employed in the preferred form of the invention, and which will be hereinafter described in greater detail. The silage lifting mechanism, which is designated generally by the numeral 20 and which comprises the principal feature of the present invention, is mounted on and surrounds said drive shaft immediately above the rotary collector, and a lateral conveyor 21 is positioned adjacent said lifting mechanism and projects radially outwardly therefrom to the doorway openings 16. In the operation of the machine, when the motor 14 is actuated the collector arm 19 is caused to travel circumferentially around the silo, moving the upper surface of the silage 22 inwardly to the center of the silo. The lifting mechanism then elevates the silage accumulated by said revolving collector arm and deposits the same on the lateral conveyor 21, which carries said silage radially outwardly to the discharge chute 17 to complete the operation.

In the illustrated form of the invention, the rotary collector 19 comprises a longitudinally-adjustable arm member 23, the inner end of which extends inwardly beyond the motor drive shaft and is bent upwardly to form an inclined ramp 26, and a laterally-disposed endless chain 24 carried by said arm and having a plurality of spaced silage collecting fingers 25 thereon. The inner end portion of said arm 23 is mounted for rotation about the motor drive shaft 18, and the inner portion of the continuous chain is trained about a sprocket wheel 27 rigidly mounted on and driven by the drive shaft immediately above said arm member. The driving mechanism for said rotary arm 23 is preferably either, as disclosed in my copending application Serial No. 820,656, filed June 16, 1959, a gear ring type, or a wall drive assemblage such as that disclosed in my copending application filed on the same date as this application and entitled "Improvements in Silo Unloaders," but any conventional drive arrangement may be used, and the particular mechanism employed is not critical to the present invention. The outer end of the chain 24 is trained about a sprocket wheel 28 mounted on the outer end of the arm member 23, and as said arm travels around the silo, said chain simultaneously moves about its sprocket wheel mountings at a high speed and the fingers 25 thereon continuously engage and move the upper surface of the silage contacted by said revolving arm inwardly toward the center of the silo.

When the projecting fingers 25 on the rapidly moving chain reach the center of the silo they turn suddenly of course, said chain being trained about the sprocket wheel 27, and the silage carried thereby is flung centrifugally from said fingers with considerable force. As mentioned, the inner portion of the collector arm 23 on which said chain is mounted is bent upwardly at an angle, and as the silage leaves the chain it is thrown up the inclined ramp 26 formed by said bent arm portion by centrifugal force and into a circular housing 29 thereabove. Said housing has a circular opening 30 in its bottom wall, and as the collector arm turns, the ramp portion 26 thereof rides around on the rim provided by said housing opening. Silage thrown up said ramp and into the housing, as described, is then engaged by one of a number of revolving blades 31 mounted on and projecting radially from the drive shaft 18 within said housing, and as said blades turn they convey the silage rapidly around the circular housing to a discharge opening 32 in the housing side wall.

As illustrated in FIGS. 2 and 3, the housing discharge opening 32 communicates with a chute 33 formed on and extending tangentially from said housing, and within said chute is a second inclined ramp 34. When the silage carried around the housing by the blades 31 reaches the opening 32 it is thrown centrifugally by said blades up said second inclined ramp and is discharged onto the lateral conveyor 21 which carries the same to the silo exterior, as described.

The design and construction of the lateral conveyor, and the conveyor driving mechanism, is best shown in FIG. 2. As will be seen therein, said conveyor comprises an endless chain 36 having spaced, silage-engaging fingers 37, and a trough 35 is mounted under one side thereof to catch and contain the silage ejected from the housing chute as described. The inner end of said chain is trained about a sprocket wheel 38 operatively associated with the motor drive shaft, and the outer end of said chain is trained about a sprocket 39 (FIG. 1) adjacent the silo wall. When the machine is in operation, said chain 36 is designed to collect the silage emitted from the housing chute 33 and convey the same radially outwardly to one of the doorway openings 16.

The outer end of the lateral conveyor 21 (FIG. 1) is supported by a bar 40 depending from a horizontal arm 41 projecting radially from the central supporting shaft 10, there being a brace 41' therebetween, and the inner end of said conveyor is pivotally secured to the housing 20. In those silos utilizing the bow-shaped doors and interior silage discharge chute disclosed in my aforementioned copending application Serial No. 820,656, said depending support bar 40 is designed to ride within the door tracks 50 on the inner surface of the silo wall, thereby insuring the accurate positioning of the machine at all times, and preventing the same from inadvertently shifting while in use.

As shown in FIG. 2, in the illustrated form of the invention the inner sprocket wheel 38 is mounted on a shaft 42 having a beveled gear 43 on its upper end, and is drivably connected to the motor drive shaft 18 through a horizontal shaft 44. The latter shaft is engaged with said drive shaft 18 by coacting beveled gears 45 and 46, and is connected to said sprocket wheel shaft through a gear 47 intermeshing with the gear 43 thereon. The outer end portion of said horizontal shaft 44 has a suitable joint 49 permitting its pivotal movement, and thereby providing positive driving means for the lateral conveyor no matter what the angle of inclination of said conveyor. It is to be understood, of course, that the invention is not limited to the exact design of the lateral conveyor, and conveyor driving mechanism, illustrated. It might be preferred, for example, to utilize a belt and sheave arrangement, or other more flexible power transmitting apparatus in place of the gear and shaft device shown, or an auger-type conveyor might be used, and the invention is not to be confined in this respect.

In the operation of the improved silo unloader comprising the present invention, the machine is lowered into a silo through a suitable winch and cable device until the rotary collector arm is resting on the surface of the silage, and the machine is positioned with the outer end of the lateral conveyor adjacent one of the silo doorway openings 16. As the motor drive shaft turns, the rotary collector 19 is driven around the silo, through any suitable mechanism drivably connecting the same to the motor drive shaft as described, and the chain 24 and attached fingers 25 continuously move the feed engaged by said revolving collector arm inwardly toward the center of the silo. When the silage reaches the center it is flung centrifugally by said chain up the inclined ramp 26 and into the housing 20 thereabove. The blades 31 within said housing, which are mounted on and rotate with the motor drive shaft, carry said silage around the housing and throw the same up another inclined ramp 34 and onto the lateral conveyor 21. Said lateral conveyor then carries the silage radially outwardly and discharges the same into the exterior chute 17. As the level of the silage descends, the entire assemblage is lowered simultaneously, by means of the winch and cable, and the lateral conveyor is repositioned in succeeding doorways as necessary.

The distinguishing feature of the present invention, of course, is the silage elevating mechanism, wherein centrifugal force is utilized as the lifting means for raising the silage from the rotary collector onto the lateral conveyor. Heretofore, silo unloading machines of the general type described have employed either an auger or bucket type mechanical lift, or an electric blower or suction apparatus, which devices are relatively expensive both to construct and to operate. With the simplified lifting device characterizing the present invention, not only is the initial cost of the structure less than that of conventional machines, but the operating cost is reduced substantially. The result is an improved silo unloader which is efficient and reliable, which is economical in operation, and which is relatively inexpensive to construct.

It is to be understood, of course, and as hereinbefore mentioned, that the improved silo unloader comprising the present invention is not to be limited or confined to the exact structural details of the individual components shown and described herein. Obvious modifications in the individual members will suggest themselves to persons skilled in the art, and all of such changes or modifications are contemplated which do not depart from the spirit of the invention and which may come within the scope of the following claims.

What I claim is:

1. A silage unloading machine for use in a cylindrical silo, comprising: a frame; a motor supported on said frame, said motor having a drive shaft depending therebelow and positioned centrally in the silo; a collector arm mounted for rotation around and projecting radially from the lower end portion of said drive shaft, the inner end of said arm extending inwardly beyond said drive shaft and having an inclined ramp thereon; means on said arm drivably connected to the motor drive shaft and adapted to move silage contacted by said arm radially-inwardly and up said inclined ramp; means drivably connecting said collector arm to the motor drive shaft for driving said arm therearound; a housing surrounding the drive shaft above said collector arm, said housing having an opening in its bottom wall to receive silage delivered up said ramp by said collector arm; and means adapted to convey silage deposited in said housing by said collector arm outwardly to the silo exterior.

2. A silo unloader, comprising: a frame; a motor supported on said frame, said motor having a drive shaft depending therebelow; a collector arm mounted for rotation around and projecting radially from the lower end portion of said drive shaft, the inner end of said arm extending inwardly beyond said drive shaft and having an inclined ramp thereon; means on said arm drivably connected to the motor drive shaft and adapted to move silage contacted by said arm radially inwardly and up said inclined ramp; means drivably connecting said collector arm to the motor drive shaft for driving said arm therearound; a housing surrounding the drive shaft above said collector arm, said housing having a circular opening in its bottom wall to receive the upper end of said collector arm ramp, and said housing having a discharge opening in its side wall; a second inclined ramp mounted adjacent said housing discharge opening; a radial blade mounted on said drive shaft within said housing and adapted to move silage deposited therein by said collector arm around said housing and up said second ramp; and means adjacent said second inclined ramp adapted to convey silage ejected from said housing radially outwardly therefrom.

3. A silage unloading machine for use in a silo, comprising: a frame; a motor supported on said frame, said motor having a drive shaft depending therebelow and positioned centrally in the silo; a collector arm mounted for rotation around and projecting radially from the lower end portion of said drive shaft, the inner end of said arm extending inwardly beyond said drive shaft and having an upwardly-directed inclined ramp thereon; and endless chain carried by said collector arm, the inner end of said chain being drivably trained about a sprocket wheel rigidly mounted on said drive shaft and the outer end thereof being trained about a sprocket wheel carried by the outer end of said collector arm; spaced, silage-gathering fingers projecting from said chain; means drivably connecting said collector arm to the motor drive shaft for driving said arm therearound; a circular housing surrounding the drive shaft above said collector arm and chain, said housing having a circular opening in its bottom wall to receive the upper end of said collector arm ramp, and said housing having a discharge opening in its side wall; a plurality of radially-projecting blades mounted on and for rotation with said drive shaft within said housing; a second inclined ramp mounted adjacent said housing discharge opening; a lateral conveyor mounted adjacent said second inclined ramp; and means drivably connecting said lateral conveyor to the motor drive shaft.

4. A silage unloading machine for use in a silo, comprising: a frame; means for raising and lowering said frame in a silo; a motor supported on said frame, said motor having a drive shaft depending therebelow and positioned centrally in the silo; a collector arm mounted for rotation around and projecting radially from the lower end portion of said motor drive shaft, the inner end of said arm extending inwardly beyond said drive shaft and being bent upwardly to form an inclined ramp; means drivably connecting said collector arm to the motor drive shaft for driving said arm therearound; an endless chain carried by and immediately above said collector arm, the inner end of said chain being drivably trained about a sprocket wheel rigidly mounted on said drive shaft and the outer end thereof being trained about a sprocket wheel carried by the outer end of said collector arm; spaced, silage-gathering fingers projecting from said chain, said fingers being adapted to throw silage accumulated by said revolving collector arm up said inclined ramp; a circular housing surrounding the drive shaft above said collector arm and chain, said housing having a circular opening in its bottom wall to receive the upper end of said collector arm ramp, and said housing having an opening in its side wall; a discharge chute formed tangentially on said housing and communicating with said side wall opening; a second inclined ramp in said discharge chute; a plurality of radially-projecting blades mounted on the drive shaft within said housing and adapted to convey silage deposited therein by said collector arm around said housing and up said second inclined ramp; a lateral conveyor mounted adjacent said housing chute and adapted to receive silage discharged therefrom and to convey the same to the silo exterior; and means drivably connecting said lateral conveyor to the motor drive shaft.

5. A silage unloading machine for use in a cylindrical silo, comprising: a frame; a motor supported on said frame; a vertical drive shaft operatively associated with said motor and positioned centrally in the silo; a revolving collector arm projecting radially from said drive shaft and drivably connected thereto; an inclined ramp projecting radially from said drive shaft adjacent the inner end of said collector arm; an endless high-speed conveyor carried by said collector arm and designed to move silage engaged by said revolving arm radially inwardly, the inner end of said conveyor being drivably trained about said drive shaft, and said endless conveyor being adapted to throw silage collected thereby up said inclined ramp by centrifugal force as the high-speed conveyor turns about said drive shaft; and means operatively associated with said motor positioned to convey silage delivered up said inclined ramp outwardly to the silo exterior.

6. A silage unloading machine for use in a cylindrical silo, comprising: a frame; a motor supported on said frame; a vertical drive shaft operatively associated with said motor and positioned centrally in the silo; a revolving collector arm projecting radially from said drive shaft and drivably connected thereto; a first inclined ramp projecting radially from said drive shaft adjacent the inner end of said collector arm; an endless high-speed conveyor carried by said collector arm and designed to move silage engaged by said revolving arm radially inwardly, the inner end of said conveyor being drivably trained about said drive shaft, and said endless conveyor being adapted to throw silage collected thereby up said first inclined ramp by centrifugal force as the high-speed conveyor turns about said drive shaft; a second inclined ramp mounted above said first ramp; means operatively associated with said drive shaft adapted to engage silage delivered up said first inclined ramp and to throw said silage up said second inclined ramp by centrifugal force; and means operatively associated with said motor positioned to convey silage delivered up said second inclined ramp outwardly to the silo exterior.

References Cited in the file of this patent

UNITED STATES PATENTS 2,718,969     Cordis _____ Sept. 27, 1955